(12) United States Patent
Ziock

(10) Patent No.: US 7,592,602 B2
(45) Date of Patent: Sep. 22, 2009

(54) DUAL-SIDED CODED-APERTURE IMAGER

(75) Inventor: Klaus-Peter Ziock, Clinton, TN (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 184 days.

(21) Appl. No.: 11/710,226

(22) Filed: Feb. 22, 2007

(65) Prior Publication Data

US 2008/0203316 A1 Aug. 28, 2008

(51) Int. Cl.
*G01T 1/00* (2006.01)
(52) U.S. Cl. ...................................... 250/393
(58) Field of Classification Search .................. 250/393
See application file for complete search history.

(56) References Cited

U.S. PATENT DOCUMENTS 6,737,652 B2 * 5/2004 Lanza et al. ............ 250/363.06
2007/0023665 A1 * 2/2007 Gallagher et al. ......... 250/358.1

\* cited by examiner

*Primary Examiner*—David P Porta
*Assistant Examiner*—Jessica L Eley
(74) *Attorney, Agent, or Firm*—John P. Wooldridge; John H. Lee

(57) ABSTRACT

In a vehicle, a single detector plane simultaneously measures radiation coming through two coded-aperture masks, one on either side of the detector. To determine which side of the vehicle a source is, the two shadow masks are inverses of each other, i.e., one is a mask and the other is the anti-mask. All of the data that is collected is processed through two versions of an image reconstruction algorithm. One treats the data as if it were obtained through the mask, the other as though the data is obtained through the anti-mask.

27 Claims, 3 Drawing Sheets

DUAL-SIDED CODED-APERTURE IMAGER

The United States Government has rights in this invention pursuant to Contract No. W-7405-ENG-48 between the United States Department of Energy and the University of California for the operation of Lawrence Livermore National Laboratory.

BACKGROUND OF THE INVENTION

1. Field of the Invention

The present invention relates to gamma ray detection, and more specifically, it relates to techniques for locating a hidden or lost gamma-ray source.

2. Description of Related Art

The general problem of finding a lost or hidden radiation source is of great interest. Prior to this invention, best practices made use of large, vehicle-mounted, radiation detectors driven through a region of interest in a regular search pattern. However, fluctuations in the naturally-occurring background radiation field limit the sensitivity to which such a search can be conducted. The background radiation field varies from place-to-place by factors of 2 or more. Such fluctuations mask the signature from weak sources that would otherwise be statistically detectable. That is, the number of radiation counts seen from the source would be statistically sufficient to say that a source was present, if one only knew what the background count rate was. This problem limits source detection to those situations where the detected count rate is comparable or stronger than any normal background radiation levels. A natural corollary of this observation is the fact that for large detectors, making the detector larger does not improve the search sensitivity. By using imaging radiation detectors to conduct the search, the source shows up as a localized point which can be distinguished from the varying background.

A gamma-ray imager significantly larger than standard search instruments has demonstrated the viability of the technique of using imaging radiation detectors. At the gamma-ray energies of interest (~50 keV to ~5 MeV), the penetrating nature of the radiation means that no wide field-of-view, direct-imaging optics such as lenses or mirrors are known. Hence, the instrument was based on the use of the coded-aperture, indirect imaging technique. This method of imaging penetrating radiation relies on a shadow mask to project a shadow pattern onto a position-sensitive detector. Images are formed using mathematical algorithms that compare the measured shadow pattern to the known shadow mask pattern. This instrument was designed to scan on just one side of the instrument using a single shadow mask paired with a single detector plane detector.

An improvement to such an instrument makes use of two exposures where the mask pattern is inverted to its "anti-mask" (the open and closed holes in the mask are exchanged) between the equal-time exposures. This is a very effective technique to remove artifacts from the image due to changes in counts versus location seen in the detector that are not due to the mask pattern. Sources of such variation include radiation scattered off of camera components and background radiation that exposes the detectors non-uniformly. One means of processing such data is to subtract the "raw" anti-mask data from the "raw" mask data set and apply the deconvolution algorithm to the resulting differenced data set. If the order in which the subtraction is performed is such that the mask data is subtracted from the anti-mask data, then an inverse (negative) image is obtained. Such a device, although an improvement over prior techniques, is still unwieldy and time consuming, requiring a first pass along a route under test after which the mask configuration is changed to the anti-mask configuration, and then the vehicle must return to the start of the route and make a second pass thereon.

A desired device and method for simultaneously collecting mask and anti-mask gamma-ray data for determining the location of a lost or hidden gamma-ray source is desirable and such is provided by the present invention.

SUMMARY OF THE INVENTION

It is an object of the present invention to provide a device and method for determining the location of a lost or hidden gamma-ray source.

It is another object of the invention to provide techniques for simultaneously collecting mask and anti-mask gamma-ray data and determining the location of a lost or hidden gamma-ray source from such data.

These and other objects will be apparent based on the disclosure herein.

Coded aperture imagers use a shadow mask to encode a radiation image onto a position-sensitive detector, allowing the generation of images for high energy gamma- or other radiation for which focusing optics do not exist. This technique has been previously described for use with a single mask located in front of a position-sensitive detector, with no mask (and possibly shielding) used to keep stray radiation from the back side of the detector. Such systems image from one side only. An improvement to the imaging search instrument described above would make use of two instruments that are back-to-back. That is, two detector planes are placed next to each other down the center of the vehicle, each with its own coded-aperture mask, one on the left side of the vehicle and one on the right side. The data from the two systems would be handled completely separately. While this approach is effective, it requires two complete instruments. Because the mask elements need merely block the radiation, they can be made of lead or other dense material and are relatively inexpensive (although the system will work with more expensive active masks.) On the other hand, the detector plane must actively sense the radiation and thus comprises the major cost of the instrument.

An aspect of the present invention recognizes that an anti-mask (inverse of open and closed pixels from the mask) when treated as a mask in the deconvolution process, will generate a negative image of the source field. This information can be used to simultaneously image from both sides of an instrument through the use of a single position-sensitive detector with a mask on its front side and an anti-mask on its back side. The location of a source is determined by the normal deconvolution process and the side of the detector that the source is on is determined by the sign of the response (positive or negative).

The invention can be used in a coded aperture-based search instrument for lost or hidden radiation sources. By adding a second mask on the other side of the detector, a single detector can be used to sweep both sides of a street for sources simultaneously. This doubles the search range of such an instrument, reducing the time required to sweep a given area by a factor of four.

BRIEF DESCRIPTION OF THE DRAWINGS

The accompanying drawings, which are incorporated into and form a part of the disclosure, illustrate embodiments of the invention and, together with the description, serve to explain the principles of the invention.

DETAILED DESCRIPTION OF THE INVENTION

Figure 1A:
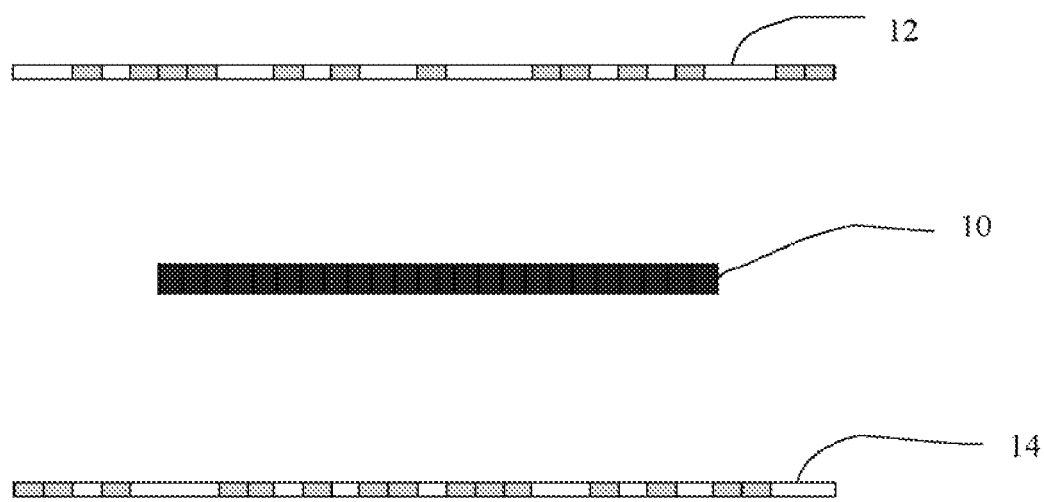
FIG. 1A shows a top view of an embodiment of the present invention.
Figure 1B:
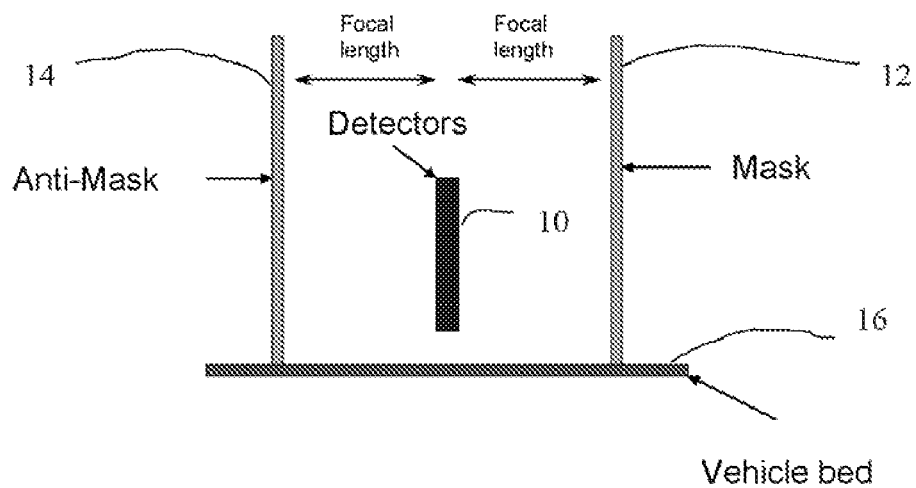
FIG. 1B shows an end view of the embodiment of FIG. 1A.

This invention provides a technique that allows one to use only a single detector plane to simultaneously measure the radiation coming through two coded-aperture masks (one on either side of the detector.) In this way, only the inexpensive mask elements need to be reproduced. A top view of an embodiment of the invention is shown schematically in FIG. 1A. A single detector array 10 down the center of the vehicle (not shown) simultaneously services two coded-aperture masks 12 and 14, one of which is the inverse of the other. The two shadow masks 12 and 14 are thus served by the single position-sensitive detector plane 10. The detectors are designed to accept radiation from the direction of either mask. To determine which side of the vehicle a source is, the two shadow masks are inverses of each other, i.e., one is a mask and the other is the anti-mask. All of the data that is collected is processed through two versions of the image reconstruction algorithm. One treats the data as if it were obtained through the mask, the other as though the data is obtained through the anti-mask. A source on the mask side of the device will appear as a positive source in the image obtained passing the data through the mask algorithm and as a negative source in the image obtained passing the data through the anti-mask algorithm. A source on the anti-mask side of the device will appear as a negative source in the image obtained passing the data through the mask algorithm and as a positive source in the image obtained passing the data through the anti-mask algorithm. FIG. 1B shows an end view of the device of FIG. 1A. Note mask 12, mask 14, vehicle bed 16 and detector array 10.

Figure 2:
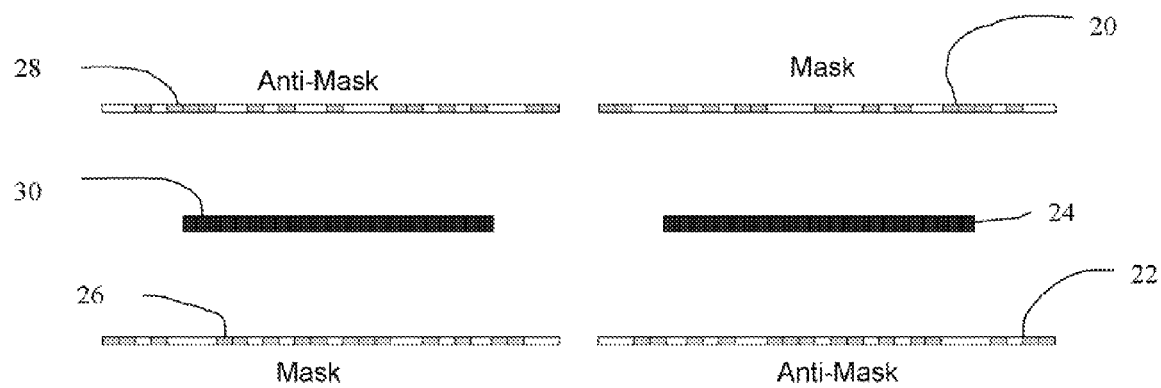
FIG. 2 shows a view of a system design where the data from two separate instruments is combined to obtain mask/anti-mask freedom from image artifacts due to count variations not caused by the coded apertures while preserving the image sign technique of determining the side of the road on which is a source.
Figure 3A:
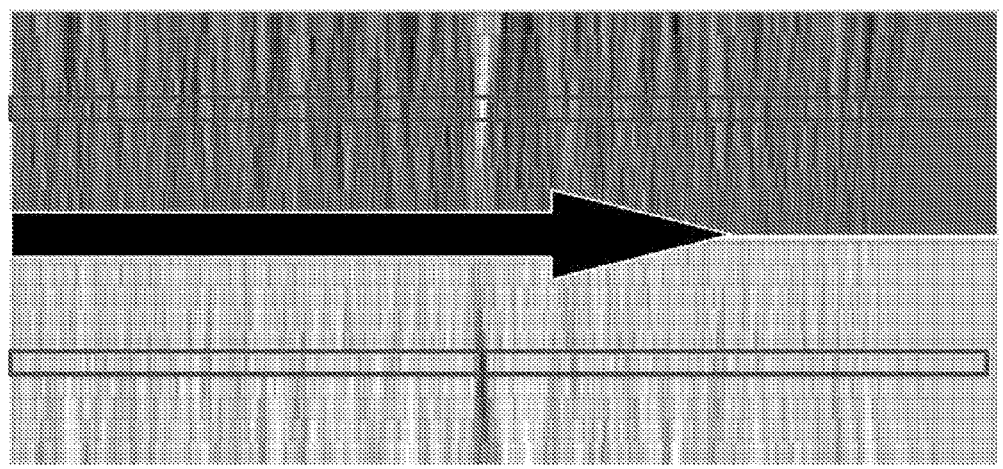
FIG. 3A shows a grayscale image obtained with a dual-sided imager.
Figure 3B:
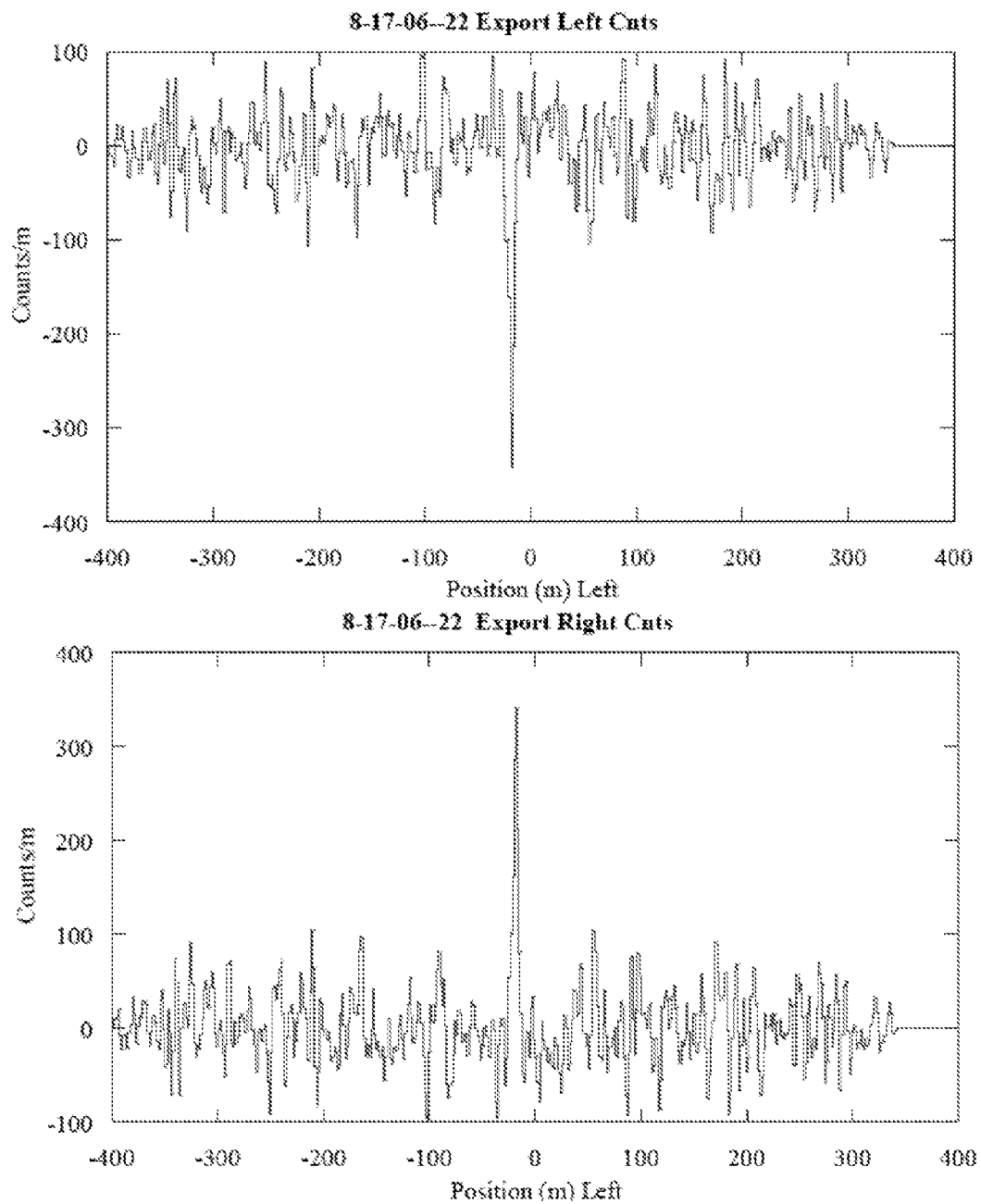
FIG. 3B shows the actual counts obtained at the range of the source where the upper graph corresponds to the left side of the vehicle, the bottom to the right side.

FIG. 2 is a top diagram of an instrument that has been built and tested. This instrument uses two versions of the invention shown in FIG. 1A, one following the other, with the mask, anti-mask sides of the devices switched between the front and back detector. The mask 20/anti-mask 22 configuration placed around detector array 24 is reversed with mask 26/anti-mask 28 configuration around detector array 30. It allows one to use mask/anti-mask processing on each side of the vehicle to remove imaging artifacts (not due to the coded apertures) but still allows one to determine the side of the vehicle that the source is on by the sign of the image. This is done by changing the order of the processing on each side of the image. For one side of the instrument the data from the forward detector is subtracted from the backward detector before processing. For the other side, the order of subtraction is reversed. The results for a single pass past a source from a distance of 50 meters is shown in FIG. 3A. The technique clearly works, showing that the source is on the right side of the vehicle. The imager travels between the images as shown by the arrow. The upper grayscale image represents what is seen on the left side of the vehicle while the lower grayscale image shows results on the right side of the instrument. For both images, darker shading means more intensity. A single source is detected on the right side of the unit, showing as a positive image (dark spot) on that side while showing as a negative image (white spot) on the other. The actual counts obtained at the range of the source are shown in the graphs in FIG. 3B. The upper graph corresponds to the left side of the vehicle and the bottom graph corresponds to the right side. Again, the source is seen as positive data (right bottom).

Although the embodiments have been described as suitable for land systems, the proposed technology is usable in air and water applications as well.

A digital computer system can be programmed to perform the method of this invention. Once programmed to perform particular functions pursuant to instructions from program software that implements the method of this invention, such digital computer system in effect becomes a special-purpose computer particular to the method of this invention. The techniques necessary for this are well-known to those skilled in the art of computer systems.

Computer programs implementing the method of this invention will commonly be distributed to users on a distribution medium such as floppy disk or CD-ROM. From there, they will often be copied to a hard disk or a similar intermediate storage medium. When the programs are to be run, they will be loaded either from their distribution medium or their intermediate storage medium into the execution memory of the computer, configuring the computer to act in accordance with the method of this invention. All these operations are well-known to those skilled in the art of computer systems.

The term "computer-readable medium" encompasses distribution media, intermediate storage media, execution memory of a computer, and any other medium or device capable of storing for later reading by a computer a computer program implementing the method of this invention.

REFERENCES

1. *Maximum detector sizes required for orphan source detection*, K. P. Ziock, K. E. Nelson, Submitted to NIM A, 2006. This reference is incorporated herein by reference.

2. *The Lost Source, Varying Backgrounds and Why Bigger May not be Better*, K. P. Ziock, W. H. Goldstein, in "Unattended Radiation Sensor Systems for Remote Applications", J. Trombka, D. Spears, P. Solomon ed., AIP Conf. Proc. 632, (American Institute of Physics, Melville, N.Y., 2002) 60-70. This reference is incorporated herein by reference.

3. *Coded aperture imaging with uniformly redundant arrays*, E. E. Fenimore and T. M. Cannon," Appl. Opt, 17, no. 3, pp. 337-347, Feb. 1978. This reference is incorporated herein by reference.

4. *Large Area Imaging Detector for Long-Range, Passive Detection of Fissile Material*, K. P. Ziock, W. C. Craig, L. Fabris, R. C. Lanza, S. Gallagher, B. K. P. Horn, N. W. Madden, IEEE Trans. Nuclear Science 51, 2238-2244, 2004. This reference is incorporated herein by reference.

5. *Source-Search Sensitivity of a Large-Area, Coded-Aperture, Gamma-Ray Imager*, K. P. Ziock, W. W. Craig, L. Fabris, R. C. Lanza, S. Gallagher, B. K. P. Horn, N. W. Madden, E. Smith, M. Woodring, Proceedings IEEE Nuclear Science Symposium and Medical Imaging Conference, Rome, Italy, Oct. 18-Oct. 23, 2005. (to appear in IEEE Trans. Nucl. Sci.) This reference is incorporated herein by reference.

6. *Scintillation Imaging: A Technique to Reduce Coding Noise in Scanned, Coded-Aperture Imagers*, K. P. Ziock, SPIE Conf. 5540, 225-234, 2004. This reference is incorporated herein by reference.

7. Co-pending U.S. patent application Ser. No. 11/710,227, titled: "Multichannel Instrumentation For Large Detector Arrays", by Lorenzo Fabris et al., filed Feb. 22, 2007, incorporated herein by reference.

The foregoing references, and all documents cited therein, and all documents cited or referenced in herein cited documents, together with any manufacturer's instructions, descriptions, product specifications, and product sheets for any products mentioned herein or in any document incorporated by reference herein, are hereby incorporated herein by reference, and may be employed in the practice of the invention.

The foregoing description of the invention has been presented for purposes of illustration and description and is not intended to be exhaustive or to limit the invention to the precise form disclosed. Many modifications and variations are possible in light of the above teaching. The embodiments disclosed were meant only to explain the principles of the invention and its practical application to thereby enable others skilled in the art to best use the invention in various embodiments and with various modifications suited to the particular use contemplated. The scope of the invention is to be defined by the following claims.

I claim:

1. A radiation source locator, comprising:
   a first coded-aperture mask and a second coded-aperture mask located in a spaced apart relationship, wherein said second coded-aperture mask is the inverse of said first coded-aperture mask;
   a first detector plane located between said first coded-aperture mask and said second coded-aperture mask;
   a third coded-aperture mask and a fourth coded-aperture mask located in a spaced apart relationship, wherein said third coded-aperture mask is the inverse of said fourth coded-aperture mask and said first coded-aperture mask, wherein fourth coded-aperture mask is the inverse of said second coded-aperture mask and said third coded-aperture mask; and
   a second detector plane located between said third coded-aperture mask and said fourth coded-aperture mask, wherein said third coded-aperture mask and said fourth coded-aperture mask and said second detector plane are all located at a common end of said first coded-aperture mask and said second coded-aperture mask and said first detector plane.

2. The radiation source locator of claim 1, wherein said first detector plane comprises a plurality of position-sensitive detectors.

3. The radiation source locator of claim 2, wherein said plurality of position-sensitive detectors are designed to accept radiation from the direction of said first coded-aperture mask and said second coded-aperture mask.

4. The radiation source locator of claim 1, wherein said first coded-aperture mask and said third coded-aperture mask are located in a first serial spaced relationship on a first side of said locator, wherein said second coded-aperture mask and said third coded-aperture mask are located in a second serial spaced relationship on a second side of said locator.

5. The radiation source locator of claim 1, further comprising a computer system operatively connected to receive data from said first detector plane, wherein said computer system comprises a computer readable medium having software including a first image reconstruction algorithm and a second image reconstruction algorithm, wherein said first image reconstruction algorithm treats said data as if it were obtained through said first coded-aperture mask, wherein said second image reconstruction algorithm treats said data as if it were obtained through said second coded-aperture mask.

6. The radiation source locator of claim 5, wherein a first source emitting radiation from a first side of said locator that is nearest to said first coded-aperture mask will appear as a first positive source in a first image obtained by passing said data through said first image reconstruction algorithm and as a first negative source in a second image obtained by passing said data through said second image reconstruction algorithm and wherein a second source emitting radiation on a second side of said locator that is nearest to said second coded-aperture mask will appear as a second negative source in a third image obtained by passing said data through said second image reconstruction algorithm and as a second positive source in a fourth image obtained by passing said data through said first image reconstruction algorithm.

7. The radiation source locator of claim 5, wherein said computer system is operatively connected to receive data from said second detector plane, wherein said computer readable medium has software including means for remove imaging artifacts not due to the coded apertures.

8. The radiation source locator of claim 7, wherein said means for removing imaging artifacts comprises software that subtracts data from said third coded-aperture mask from data from said first coded-aperture mask and further subtracts data from said second coded-aperture mask from said fourth coded-aperture mask.

9. The radiation source locator of claim 7, wherein said means for removing imaging artifacts comprises software that subtracts data from said first coded-aperture mask from data from said third coded-aperture mask and further subtracts data from said fourth coded-aperture mask from said second coded-aperture mask.

10. The radiation source locator of claim 1, wherein said locator is affixed to a vehicle.

11. The radiation source locator of claim 10, wherein said vehicle is configured to travel in air.

12. The radiation source locator of claim 10, wherein said vehicle is configured to travel on land.

13. The radiation source locator of claim 10, wherein said vehicle is configured to travel in or on water.

14. A method for locating a radiation source, comprising:
   providing a radiation source locator device comprising:
      a first coded-aperture mask and a second coded-aperture mask located in a spaced apart relationship, wherein said second coded-aperture mask is the inverse of said first coded-aperture mask;
      a first detector plane located between said first coded-aperture mask and said second coded-aperture mask;
      a third coded-aperture mask and a fourth coded-aperture mask located in a spaced apart relationship, wherein said third coded-aperture mask is the inverse of said fourth coded-aperture mask and said first coded-aperture mask, wherein fourth coded-aperture mask is the inverse of said second coded-aperture mask and said third coded-aperture mask; and
      a second detector plane located between said third coded-aperture mask and said fourth coded-aperture mask, wherein said third coded-aperture mask and said fourth coded-aperture mask and said second detector plane are all located at a common end of said first coded-aperture mask and said second coded-aperture mask and said first detector plane;
   moving said device along a route under test for a radiation source; and
   collecting and analyzing data collected by said first detector plane, wherein said data is analyzed on a computer system operatively connected to receive said data from said first detector plane, wherein said computer system comprises a computer readable medium having software including a first image reconstruction algorithm and a second image reconstruction algorithm, wherein said first image reconstruction algorithm treats said data as if it were obtained through said first coded-aperture mask, wherein said second image reconstruction algorithm treats said data as if it were obtained through said second coded-aperture mask.

15. The method of claim 14, wherein a first source emitting radiation from a first side of said locator that is nearest to said first coded-aperture mask will appear as a first positive source in a first image obtained by passing said data through said first image reconstruction algorithm and as a first negative source in a second image obtained by passing said data through said second image reconstruction algorithm and wherein a second source emitting radiation on a second side of said locator that is nearest to said second coded-aperture mask will appear as a second negative source in a third image obtained by passing said data through said second image reconstruction algorithm and as a second positive source in a fourth image obtained by passing said data through said first image reconstruction algorithm.

16. The method of claim 14, wherein said first coded-aperture mask and said third coded-aperture mask are located in a first serial spaced relationship on a first side of said locator, wherein said second coded-aperture mask and said third coded-aperture mask are located in a second serial spaced relationship on a second side of said locator.

17. The method of claim 14, further comprising a computer system operatively connected to receive data from said first detector plane, wherein said computer system comprises a computer readable medium having software including a first image reconstruction algorithm and a second image reconstruction algorithm, wherein said first image reconstruction algorithm treats said data as if it were obtained through said first coded-aperture mask, wherein said second image reconstruction algorithm treats said data as if it were obtained through said second coded-aperture mask.

18. The method of claim 17, wherein a first source emitting radiation from a first side of said locator that is nearest to said first coded-aperture mask will appear as a first positive source in a first image obtained by passing said data through said first image reconstruction algorithm and as a first negative source in a second image obtained by passing said data through said second image reconstruction algorithm and wherein a second source emitting radiation on a second side of said locator that is nearest to said second coded-aperture mask will appear as a second negative source in a third image obtained by passing said data through said second image reconstruction algorithm and as a second positive source in a fourth image obtained by passing said data through said first image reconstruction algorithm.

19. The method of claim 17, wherein said computer system is operatively connected to receive data from said second detector plane, wherein said computer readable medium has software including means for remove imaging artifacts not due to the coded apertures.

20. The method of claim 19, wherein said means for removing imaging artifacts comprises software that subtracts data from said third coded-aperture mask from data from said first coded-aperture mask and further subtracts data from said second coded-aperture mask from said fourth coded-aperture mask.

21. The method of claim 19, wherein said means for removing imaging artifacts comprises software that subtracts data from said first coded-aperture mask from data from said third coded-aperture mask and further subtracts data from said fourth coded-aperture mask from said second coded-aperture mask.

22. The method of claim 14 wherein said first detector plane comprises a plurality of position-sensitive detectors.

23. The method of claim 22, wherein said plurality of position-sensitive detector are designed to accept radiation from the direction of said first coded-aperture mask and said second coded-aperture mask.

24. The method of claim 14, wherein said locator is affixed to a vehicle.

25. The method of claim 24, wherein said vehicle is configured to travel in air.

26. The method of claim 24, wherein said vehicle is configured to travel on land.

27. The method of claim 24, wherein said vehicle is configured to travel in or on water.

* * * * *